United States Patent [19]

Steinberg

[11] 4,429,545

[45] Feb. 7, 1984

[54] SOLAR HEATING SYSTEM

[75] Inventor: Alfred Steinberg, Riverdale, N.J.

[73] Assignee: Ocean & Atmospheric Science, Inc., Dobþs Ferry, N.Y.

[21] Appl. No.: 289,208

[22] Filed: Aug. 3, 1981

[51] Int. Cl.³ ............................ F25B 27/00; F25B 27/02
[52] U.S. Cl. .................................... 62/235.1; 62/238.3
[58] Field of Search ................. 62/235.1, 238.6, 238.3, 62/148; 126/432; 237/2 B

[56] References Cited

U.S. PATENT DOCUMENTS

| | | | |
|---|---|---|---|
| 2,030,350 | 2/1936 | Bremser | 62/235.1 X |
| 4,205,529 | 6/1980 | Ko | 62/238.3 X |
| 4,220,138 | 9/1980 | Bottum | 62/235.1 X |
| 4,222,244 | 9/1980 | Meckler | 62/235.1 |
| 4,251,997 | 2/1981 | Newton | 62/235.1 X |
| 4,273,184 | 6/1981 | Tanaka | 62/235.1 |
| 4,301,965 | 11/1981 | Ritter et al. | 126/432 X |
| 4,308,042 | 12/1981 | Ecker | 62/235.1 X |
| 4,327,555 | 5/1982 | Dimon | 62/235.1 |
| 4,339,930 | 7/1982 | Kirts | 62/235.1 |
| 4,352,272 | 10/1982 | Taplay | 62/235.1 |
| 4,363,218 | 12/1982 | Nussbaum | 62/235.1 |

Primary Examiner—Lloyd L. King

Attorney, Agent, or Firm—McGlew and Tuttle

[57] ABSTRACT

A solar heating system including a flat plate solar collector having a heat absorber woven basket fashion across a riser grid system containing suitable flow medium for being heated by the solar radiation. A heat exchange column is coupled to the riser grid system for extracting the heat from the flow medium to provide it to heating, hot water, and the like. The heat exchange column includes a number of continuous coils placed within a tank and having a circulating loop pass a liquid from the bottom of the tank to the top of the tank where it will flow over all of the coils transferring heat from one coil to the other. The flow is controlled by means of the load demand and the available supply of heat. Excess heat is stored in a heat storage system having a plurality of blocks of Glauber salt containing matrix material through which pass pipes containing the heated liquid. One of the riser grid systems can be utilized as part of an absorption cycle air conditioning system by passing the heated fluid medium into a regenerator placed adjacent to the collector to effectively form a distillation process. In place of the liquid solar collector, an air heating solar collector is also provided.

40 Claims, 23 Drawing Figures

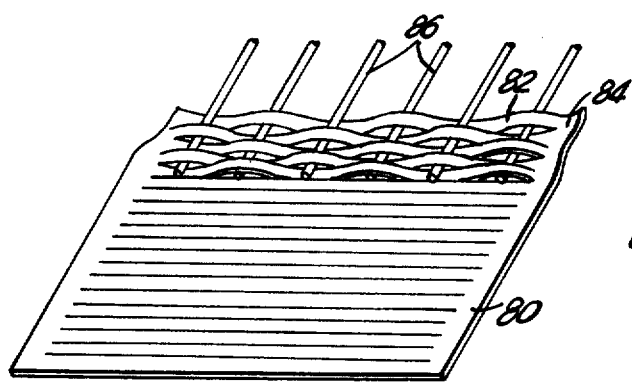
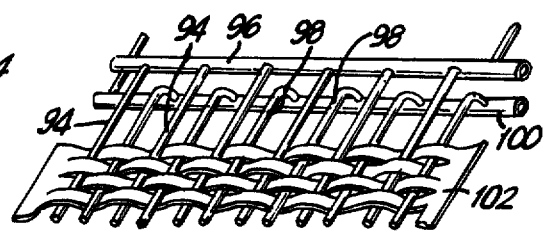
FIG.7 FIG.8
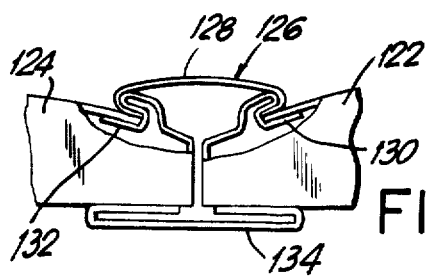
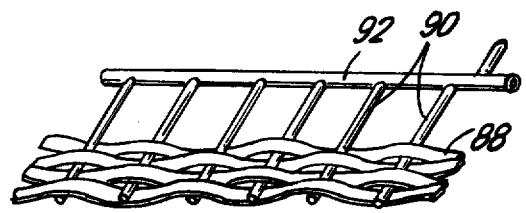
FIG.10 FIG.9
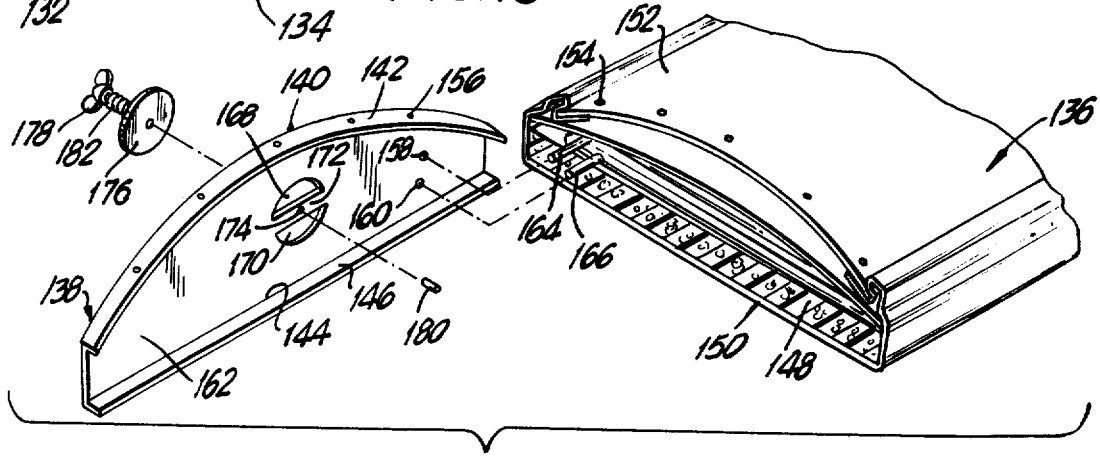
FIG.11
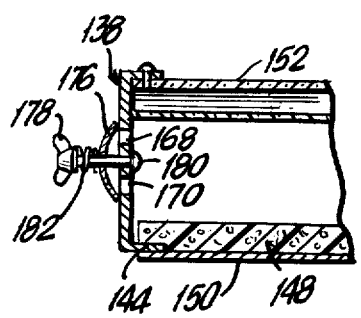
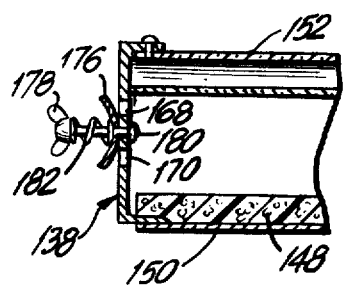
FIG.12 FIG.13

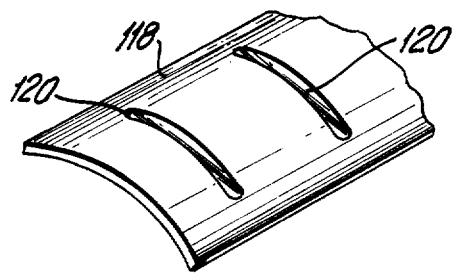
FIG.14
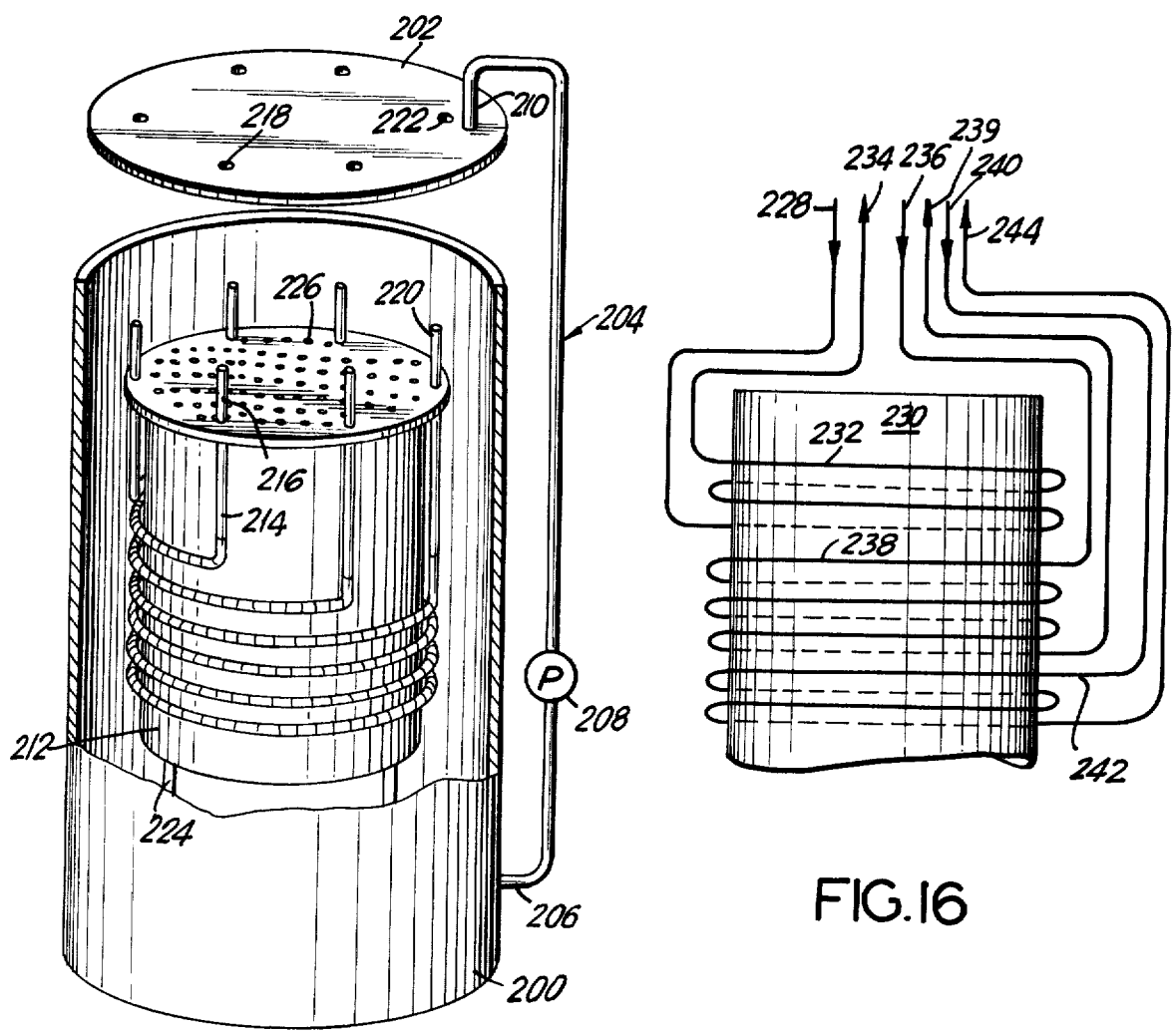
FIG.15
FIG.16

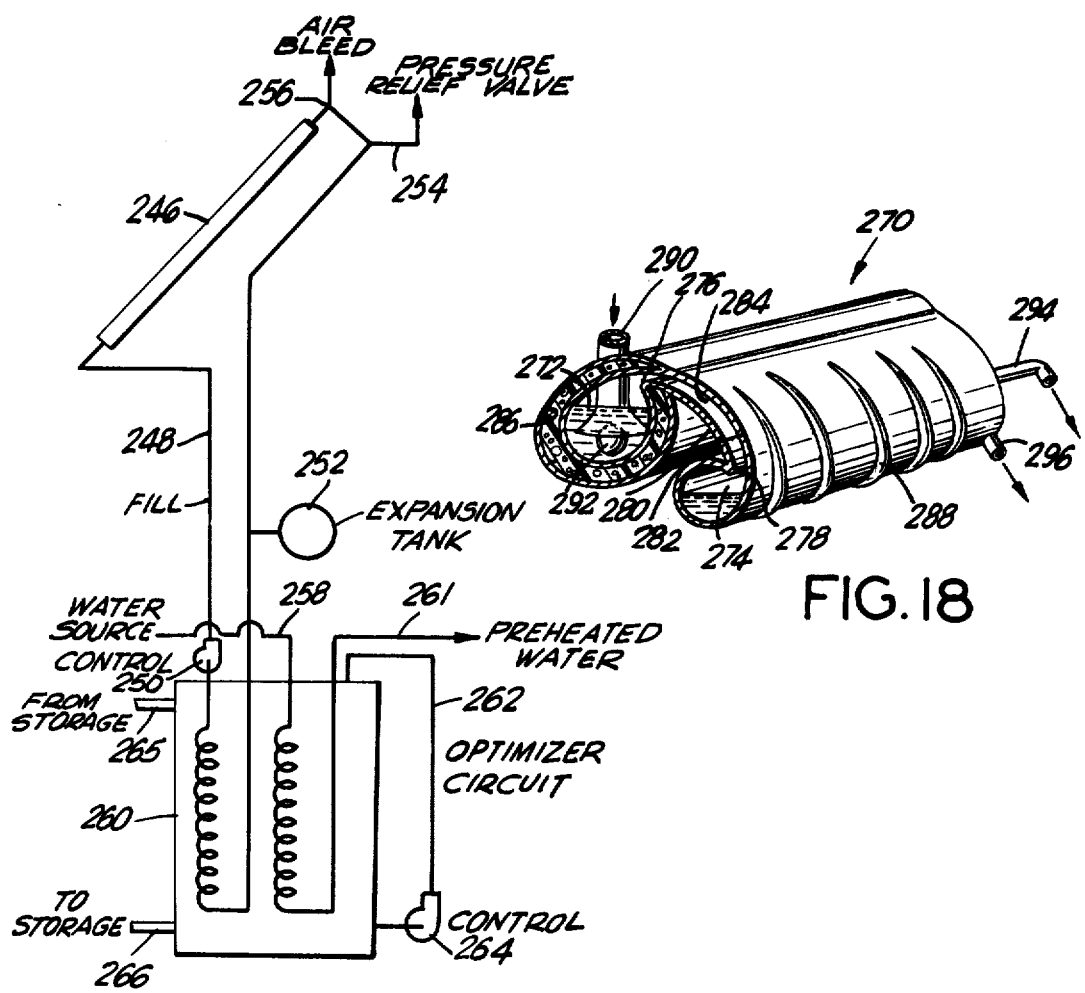
FIG.17
FIG.18
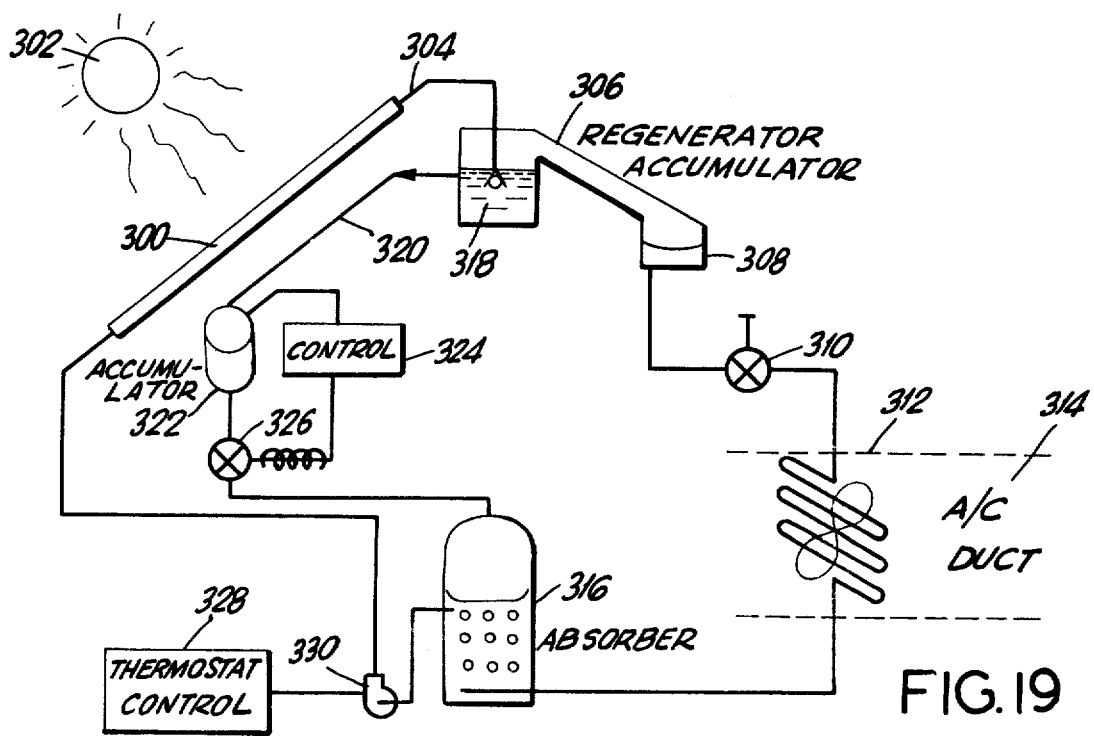
FIG.19

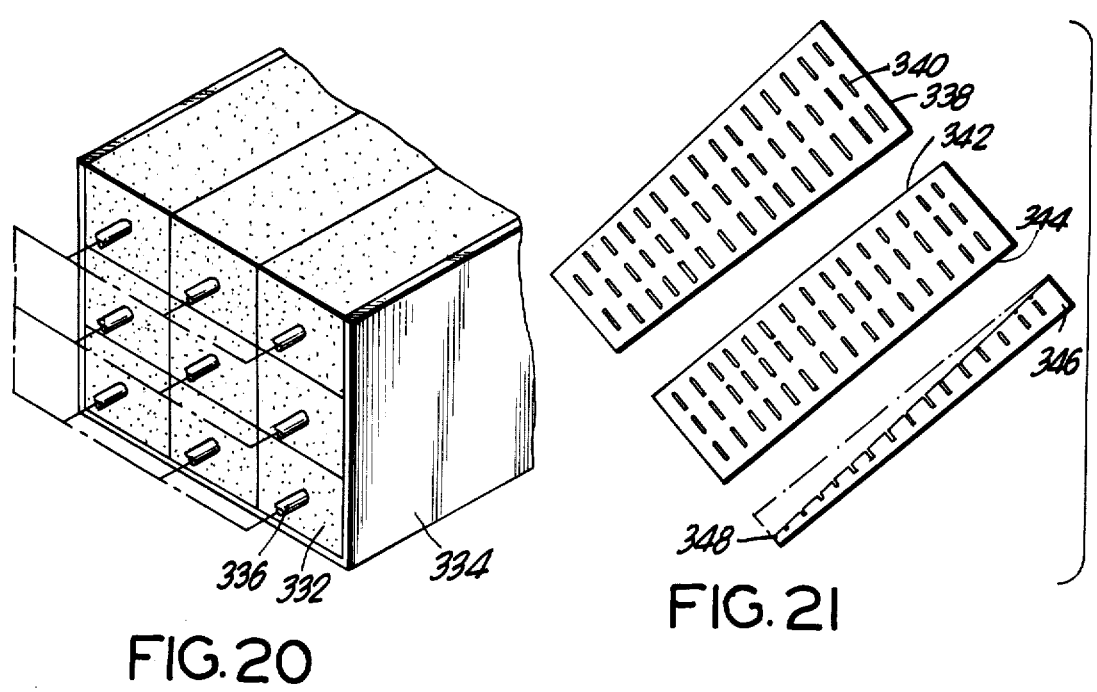
FIG.20
FIG.21
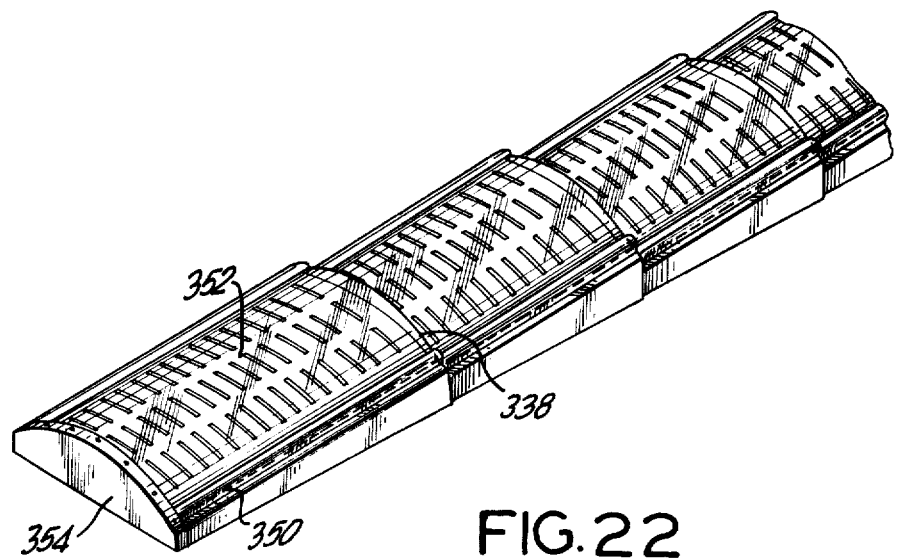
FIG.22
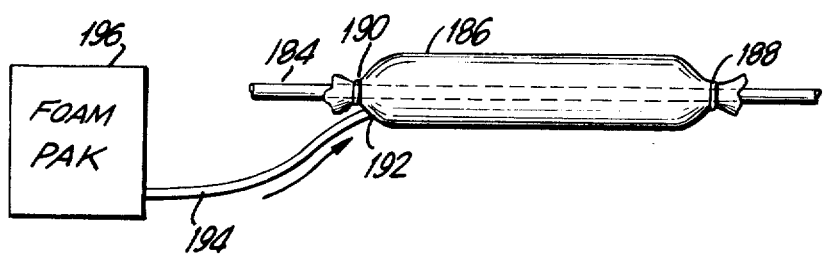
FIG.23

SOLAR HEATING SYSTEM

BACKGROUND OF THE INVENTION

This invention relates to solar energy and more particularly to apparatus for use in a solar energy system, including a flat plate solar collector, heat exchange unit, a regenerator for use in conjunction with solar driven air conditioning systems, and an improved heat storage apparatus.

With increased cost of energy sources, especially fossil fuels, and with apprehension concerning fissile fuel sources, there is greater stress being placed on the utilization of solar energy as a suitable source. Although numerous proposals have been made on efficient utilization of solar energy and although many solar energy systems are already in existence, none of these have been widely accepted, mainly because of the great cost of such systems, the excessive weight requirement of the solar collector and other parts of the system and the rather limited efficiency provided by such systems.

Most of the solar energy systems use collectors to trap the sun's heat and transfer it to a flow medium usually either air or water. The flow medium conveys the heat and utilizes it either directly or through further conversion for hot water heating, area heating, and even cooking. It also stores a portion of the absorbed heat in a storage device from which the heat can be withdrawn during the night.

The solar collectors which are commonly used are of various types. One type is referred to as the flat plate solor collector. Some of these use plastic absorber sheets for low cost and reduced weight. However, there results a great deficiency in performance and longevity of such collectors. Those collectors which have high efficiency performance use copper absorber sheets. However, these are extremely heavy and require extra support in order to retain such collectors. On top of the collectors there is usually placed a sheet of flat glass which is generally thick and heavy or else flat plastic is utilized. Both of these materials tend to sag unattractively across the collector span. Additionally, the glass is frequently unsupported and accordingly tends to be fragile.

In addition to problems with existing flat plate solar collectors, other problems with solar energy systems relate to the fact that such systems may find use for heating, however a separate energy source is generally needed for air conditioning. In those colder climates where only heating is needed and generally air conditioning is not utilized, a high efficient solar energy system may be useful. On the other hand, in those areas where both heating and air conditioning are generally provided in housing for alternate use during the year, the use of a solar heating system is costly since a separate source of energy must be provided to drive the air conditioning. This is of particular concern since the solar energy is generally strongest in those areas which need heat the least and on the other hand require more air conditioning. Accordingly, while the sun is available in certain areas, rather than heat being required, air conditioning is needed.

Another drawback with existing solar energy systems concerns the storage of the heat for nighttime use, or darkened use. Most present storage units use water or other such similar medium to store the heat by raising the temperature of the water. The heat is stored in such water and during nighttime or darkened periods the heat is extracted by utilizing the heat and lowering its temperature. However, the efficiency of such storage of heat is limited and the size of a storage tank needed to store sufficient heat is generally massive.

Further problems existing with present solar energy systems concern the heat exchanger. Once the heat in the flow medium is obtained by means of the solar collector, the heat from the flow medium must be extracted for use in connection with heating, hot water systems, and other similar devices. For extracting the heat, a heat exchanger is generally used. Generally utilized heat exchangers are low in efficiency as a result of which much of the heat is not converted to useful purposes and is rather wasted.

Accordingly, although solar energy is available, its use has been limited because of numerous problems with present day equipment. Improvement in such equipment can result in beneficial utilization of solar energy as a source of heating.

SUMMARY OF THE INVENTION

Accordingly, it is an object of the present invention to provide an improved solar energy system.

Another object of the present invention is to provide a solar heating system which avoids the aforementioned problems of prior art apparatus.

Still another object of the present invention is to provide an improved flat plate solar collector which avoids the aforementioned problems of prior art devices.

A further object of the present invention is to provide an improved flat plate solar collector which is light in weight and reduced in cost, and can be provided in various sizes.

Still another object of the present invention is to provide a flat plate solar collector utilizing water as a flow medium.

Another object of the present invention is to provide an air heating solar collector system using a flat plate air heating solar collector.

Yet another object of the present invention is to provide a solar energy system which utilizes solar energy both for heating and air conditioning.

Still another object of the present invention is to provide a solar collector system utilizing solar energy for providing the heat for hot water, heating, and the like, and also for using the solar energy for heating a flow medium as part of an absorption cycle air conditioning system.

A further object of the present invention is to provide a solar energy system which utilizes the heat generated in a solar collector in combination with a regenerator for high efficient distillation purposes.

Another object of the present invention is to provide a solar energy system for providing heat for use in conjunction with a regenerator as part of an absorption cycle air conditioning system.

Yet another object of the present invention is to provide a solar energy system for use both for heating and air conditioning whereby during sunlit periods the solar energy forms the source of the heat and during darkened or nighttime periods excess heat stored during the day is transferred back and utilized as the source of heat for the heating, hot water, as well as air conditioning, as is needed.

Yet a further object of the present invention is to provide an improved thermal exchange unit.

Another object of the present invention is to provide a thermal exchange column wherein energy in the form of heat can be transferred from one flow medium to other flow mediums.

Another object of the present invention is to provide a thermal exchange unit which provides heat exchange in accordance with both the demand requirement and the supply requirement and adjusts itself accordingly.

Another object of the present invention is to provide an improved storage medium for excess heat.

A further object of the present invention is to provide storage of heat in the form of microencapsulated eutectic.

Numerous other features and objects will become evident from the following description taken in conjunction with the drawings.

Briefly, in accordance with the present invention, there is provided a solar heating system including a solar collector having a heat absorber for absorption of the solar radiation and two separate riser grid systems containing a suitable flow medium in each of the systems. A heat exchange unit is coupled to one of the riser grid systems for extracting the heat from the flow medium in that system in order to provide heating, hot water, and the like. A regeneration unit is coupled to the second of the riser grid systems for distillation of the flow medium therein to extract a component therefrom for further utilization.

In an embodiment of the invention the regeneration means is part of an absorption cycle air conditioning system whereby the extracted component is the refrigerant for use in the air conditioning system. A storage unit can also be placed in heat exchange relationship with the heat exchanger and used to store excess heat obtained during the daytime. During sunlit hours, the sun is collected and is utilized directly for heating, hot water, and the like in the first riser grid system, and is utilized as part of the absorption cycle air conditioning system in the second riser grid system. Excess heat is stored. During darkened hours, the heat is extracted from the storage unit and coupled to the flow medium in the first riser grid system and sent back through the solar collector where it is in heat exchange relationship with the second riser grid system. As a result, the heat now provided in the first riser grid system will directly provide heating, hot water, and the like, as is needed. At the same time, it will transfer heat to the second riser grid system so that nighttime operation of the air conditioning can also be provided, if needed.

In an embodiment of the invention, there is also provided a flat plate solar collector including a riser grid system with a sheet of heat absorption material formed into strips and interwoven basket fashion across the riser grid system. An enclosure system is provided for supporting the interwoven absorber and riser grid system. Such collectors can be formed in elongated sections which can be coupled together so as to form a composite roof which can actually replace existing roofs. The heat absorber and the enclosure can be formed of lightweight aluminum material and the grid system can be formed of copper. On the upper surface of the enclosure there is placed a glazing system with the glass or plastic formed in an arcuate shape and held in place by means of roll-formed "pittsburgh" bends formed directly in the enclosure pan. Such solar collectors are light in weight, highly efficient, and reduced in cost.

An alternate type of solar collector that is provided is an air heating flat plate solar collector which includes an enclosure with a single or plurality of perforated absorber sheets each angularly oriented within the enclosure and longitudinally stacked in overlapping spaced apart relationship with each other. Each absorber sheet is arcuate in cross section when installed in the enclosure. The lower end of the sheets are flat and adjacent to the bottom of the enclosure and the upper end of each sheet is curved against the top of the enclosure which is glazing material.

In accordance with an embodiment of the present invention, there is also provided an improved heat exchange unit which includes a container with a least one continuous coil in the container which brings heat to the thermal exchange unit by means of heated flow medium flowing through this coil. A number of additional continuous coils are also placed in the container. Each has its own flow medium which is sent to a respective utilization means such as domestic heating, hot water supply, and the like. Preferably, each of the coils are wrapped around an inverted drum held within the container. A circulating loop external of the container collects liquid from the bottom of the container and pumps it to the top of the container whereby the liquid will flow onto all of the coils and will be concentrated by the drum so that it provides a high efficient transfer of heat from the first coil to the other coils. The drum top is perforated to obviate embolisms. A control device responds to load demand of the utilization means as well as to the available supply of heat and controls the liquid in the circulating loop.

The present invention also includes a regenerator unit which can be placed close to the solar collector so as to better utilize the heat provided by the solar collector as part of a distillation process. The regenerator unit includes an evaporation chamber and a condensing chamber which are interconnected by means of a ductway. The evaporation chamber is maintained in a heated condition while the condensing chamber is maintained in a cooled condition The heated flow medium enters the evaporation chamber and a first output is taken from the condensing chamber which extracts the distillate component while a second output is coupled to the evaporation chamber for extracting the residual flow medium. Such combination of the heated flow medium from the solar collector with the regenerator unit can provide the necessary distillation for use in an absorption cycle air conditioning system. In this manner, solar energy can be utilized for air conditioning purposes.

In an embodiment of the present invention, external pipes are utilized as manifolds or headers to interconnect the riser grid systems from the flat plate solar collectors. The insulation required on such pipes can be provided in situ in accordance with the present invention by placing an inexpensive sleeve around these pipe and frothing foam insulation inside the sleeve which will harden around the pipes to form an in situ insulated pipe.

In an embodiment of the invention, the storage of the excess heat is achieved as a microencapsulated eutectic. Specifically, there is provided an eutectic approach which obviates the disadvantages of salt separation by providing a stable matrix that supports large amount of small Globular eutective volumes that maintain performance because separation cannot not occur in this configuration. Typically, this configuration is achieved by mixing accelerated polyester with molten Glauber salt (eutectic) similar to what is achieved presently as water extended polyester. These thermal storage systems can be formed as blocks with heater pipes cast in the blocks.

BRIEF DESCRIPTION OF THE DRAWINGS

In the drawings:

FIG. 7 is a perspective view showing placement of the aluminum sheet absorber onto the grid riser in interwoven basket weave fashion;

FIG. 8 is a perspective view of the double riser grid system;

FIG. 9 is a perspective view showing an absorber sheet woven onto a grid and having open lateral ends;

FIG. 10 is a partial vertical view showing a snap cap and drain strip interconnecting adjacent solar collector units;

FIG. 11 is an exploded view showing a closure member with a snap disc vent arrangement;

FIG. 12 is a vertical sectional view showing the vent arrangement being in a closed position;

FIG. 13 is a vertical sectional view showing the vent arrangement in an open position;

FIG. 14 is a perspective section of one embodiment of glass or acrylic modified FGR glazing;

FIG. 15 is a partial broken away perspective view showing the thermal exchange column, in accordance with the present invention;

FIG. 16 is a schematic drawing showing the windings of the various coils around the drum of the thermal exchange column;

FIG. 17 is a schematic drawing showing the use of the thermal exchange column within the system;

FIG. 18 is a perspective sectional view of the linear regenerator-accumulator unit in accordance with the present invention;

FIG. 19 is a schematic view showing use of the regenerator-accumulator within a solar collector system;

FIG. 20 is a schematic view showing the use of microencapsulated storage blocks;

FIG. 21 shows steps in the formation of the absorber sheets for the air heating flat plate solar collector;

FIG. 22 shows a perspective view of the air heating flat plate solar collector; and FIG. 23 shows a schematic view of the formation in situ of insulation around a tube.

In the various figures of the drawing, like reference characters designate like parts.

DESCRIPTION OF THE PREFERRED EMBODIMENTS

Figure 1:
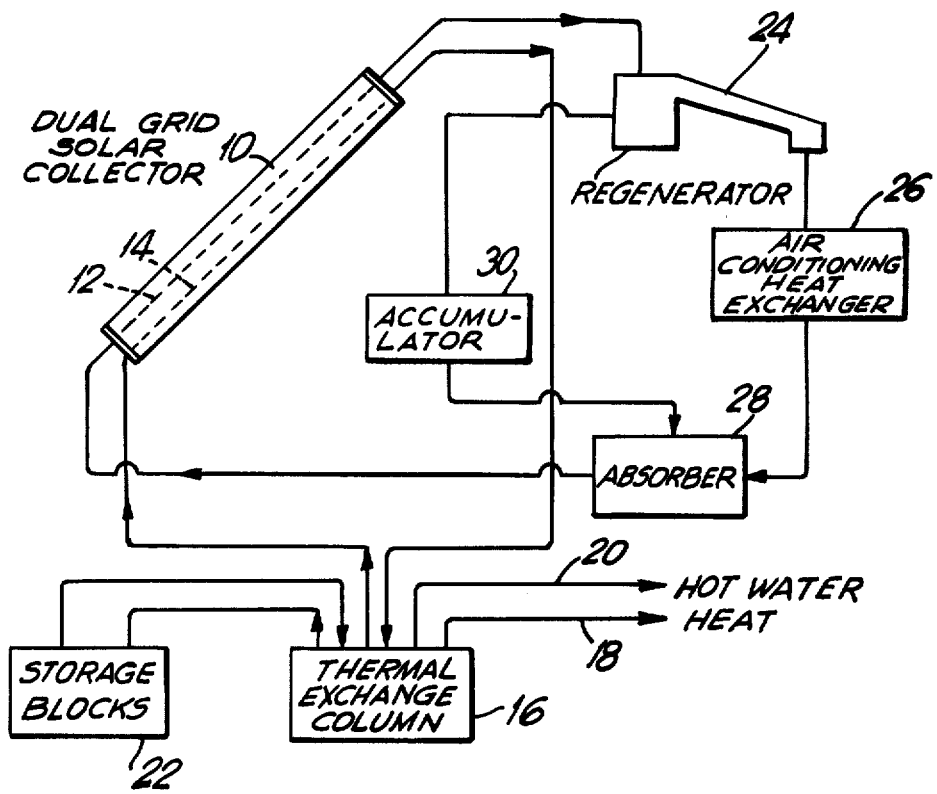
FIG. 1 is a block diagram of the solar energy system in accordance with the present invention.

Referring now to FIG. 1, there is shown a block diagram of the solar heating system in accordance with the present invention. The solar heating system includes a flat plate solar collector shown generally at 10 which can be positioned on the roof, or other suitable location of a building for collection of the thermal energy from the sun's rays. In the flat plate collector are two grid systems 12, 14 whose tubes pass through the solar collector and through which separate fluid mediums pass. The fluid medium heated within the grid system 14 passes into a thermal exchange column 16 where the heat absorbed in the medium is extracted and serves to suitably heat the necessary flow medium in a heating system 18 as well as to provide the necessary heat for a hot water system 20. Other heating units could be included, for example cooking, etc. Extra heat is sent to a storage medium 22, which stores the extra heat during the sunlit hours and during the darkened periods such as nighttime, the stored heat is sent back through the thermal exchange column 16

The fluid heated through the grid system 12, is sent to a linear regenerator 24 positioned adjacent to the flat plate collector 10. The regenerator in combination with the heat provided by the collector effectively performs a distillation function. Accordingly, the combination of the heated fluid and the regenerator can be utilized as the distillation part of an absorption cycle air conditioning system. The refrigerant output from the regenerator is sent to the air conditioning heat exchange unit 26 from where the cooling will take place. The additional parts of such an absorption cycle air conditioning system are well known. Following heat extraction in the air conditioning system, the refrigerant fluid is sent to an absorber 28 where it is combined with the flow medium extracted from the regenerator and sent to an accumulator 30 prior to entry into the absorber. From the absorber the fluid mixture is again sent to the solar collector to be reheated.

It will therefore be appreciated, that by using the dual grid solar collector, in conjunction with the other parts, the solar energy is utilized both for heating as well as for air conditioning purposes. Accordingly, this system can be utilized in those climates where both heating and air conditioning are needed. During the sunlit hours, direct heating of the dual grid system will provide the necessary heat for air conditioning, hot water, heating, etc. as is needed. The excess will be stored in the storage unit 22. Additionally, during the darkened hours, the heat is extracted from the storage unit 22 and sent back to the thermal exchange column where it serves to heat the hot water. At the same time, it will also heat the fluid flowing in the grid system 14 so that this heated fluid flow will actually be sent through the grid system 14 and pass through the flat plate solar collector 10. The fluid in the other grid system 12, is in thermal exchange relationship with the grid system 14 in the solar collector 10 so that the fluid in grid system 12 will be heated by the stored heat during darkened hours. As a result, it will provide the necessary heat to combine with the regeneration operation to continue the air conditioning cycle, even during darkened hours.

Accordingly, with the present combined system, use of the solar energy can be provided both during sunlit and during darkened hours, either directly or through storage, and utilized for air conditioning as well as all types of heating.

By positioning the regenerator close to the solar collector, losses of heat will be eliminated. As a result, sufficient heat will be available through the solar collector so that as the fluid flows into the regenerator, it will be evaporated so that the refrigerant can be separated from the medium. The separated material will then be condensed at the other end of the regenerator for utilization in the absorption cycle air conditioning system.

Figure 2:
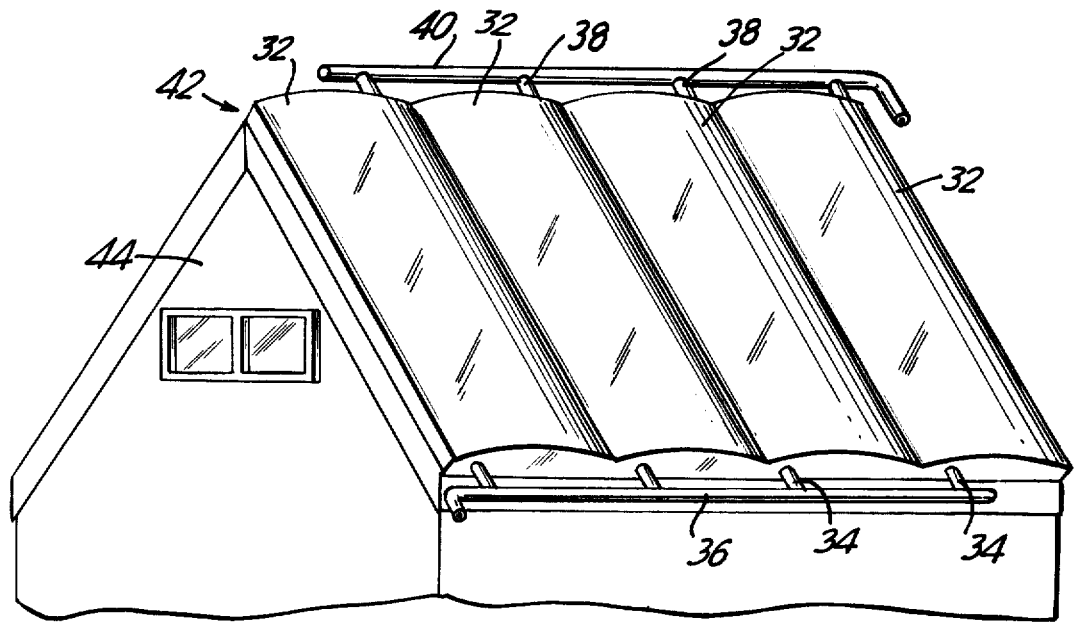
FIG. 2 is a perspective view of a flat plate solar collector placed on a roof, in accordance with the present invention.

The flat plate solar collector of the present invention can be formed as part of a roof system, as is shown in FIG. 2. Specifically, a flat plate collector is formed in sections 32 which are elongated and adjacently positioned to other sections whereby they can be united to form an entire roof. In fact, the sections can be suitably interconnected, as will hereinafter be explained, so that they can actually be utilized in place of existing roofs, and form a complete roof section which is water tight and at the same time collect the solar energy.

The particular solar collectors are shown as having a single grid system contained within each section. The riser grid system in each section is fed by means of a single inlet 34 in each section with all of the inlets being connected to a common external header 36 placed at the lower end beneath the collector sections. The fluid medium will be fed into each section and will be heated as it passes through each solar collector section 32. The heated fluid medium is then extracted from each section by means of the outlet 38 with all of the outlets interconnected into a common header 40 which combines all of the fluid and sends it into the remaining heating system. When the collectors replace the existing roof, the installation will extend from ridge to eave eliminating the need for conventional roofing. The headers would then be above and below respectively the ridge and eave of the roof.

When utilizing a single riser grid system within each solar collector panel, the fluid medium would then be sent to conventional heating, hot water, and systems similar thereto. When air conditioning is also to be run from the solar system, a dual grid system will be utilized as explained heretofore in connection with FIG. 1. The connections for the dual grid system will be shown in connection with subsequent figures.

As shown in FIG. 2, the solar collector is placed upon an existing roof 42 to provide heating to the house 44 therebeneath. However, it should be understood that the solar flat plate collector could be located at other suitable positions with respect to a building structure in order to best be in a position to collect the solar energy.

Figure 3:
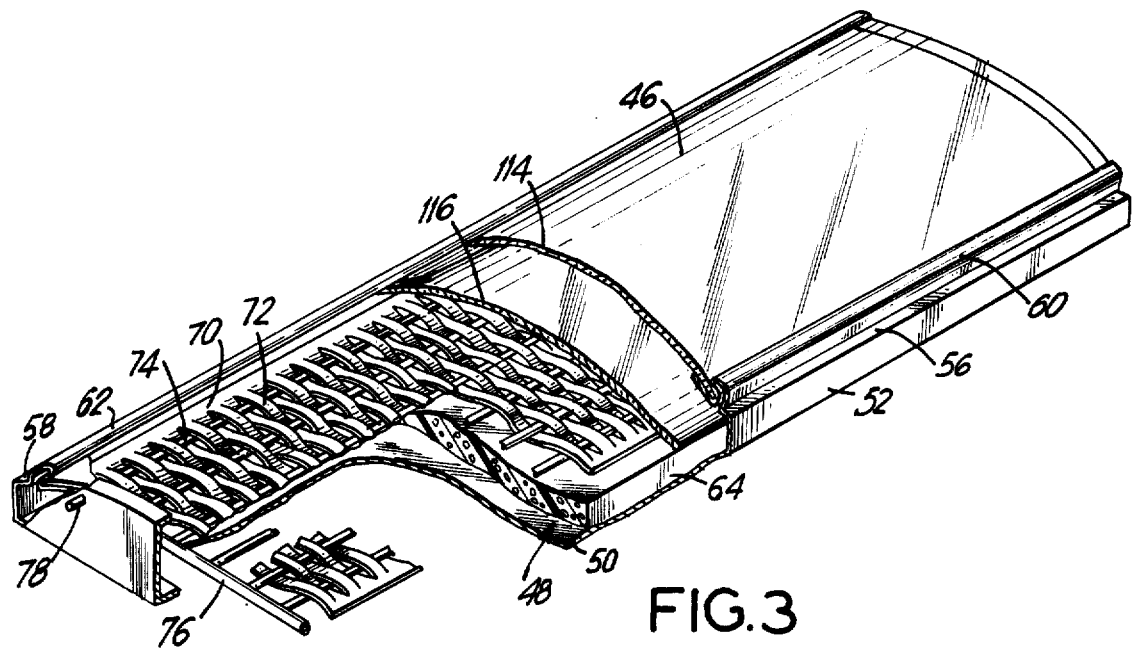
FIG. 3 is a perspective view, partially broken away, of one section of a flat plate solar collector.
Figure 4:
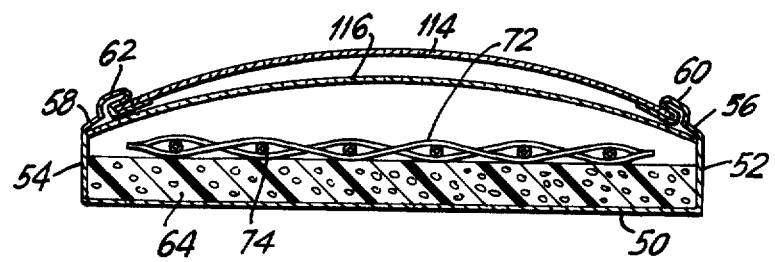
FIG. 4 is a cross sectional view of the flat plate solar collector shown in FIG. 3.

Referring now to FIGS. 3 and 4, there is shown an embodiment of one section of the flat plate solar collector in accordance with the present invention. The collector section shown generally at 46 comprises an enclosure pan 48 having a base wall 50 and upstanding side walls 52, 54. Each of the side walls continue with the inwardly extending, upwardly directed arms 56, 58 extending partly along the upper surface of the collector. "Pittsburgh" bends 60, 62 are formed in the arms. Typically, the pan is of roll formed aluminum and the "Pittsburgh" bends are roll formed directly in the material.

In this manner, the enclosure is designed to be as lightweight as possible and easy to manufacture. The enclosure pan can be formed to any length with the "Pittsburghs" formed on each side. The flat aluminum enclosure can be rolled off a coil into an appropriate roll former to continuously produce the pan which can then be cut as desired.

Figure 5:
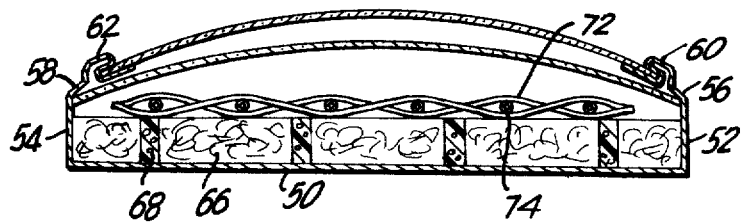
FIG. 5 is a cross sectional views showing another embodiment of the solar plate collector and specifically showing insulation supported from the bottom of the enclosure pan.

Placed on the base 50 of the enclosure pan 48 is insulation 64. Such insulation can be formed in sheets, as shown in FIG. 4. Alternately, soft material such as glass fiber, etc. can be used as is shown in FIG. 5, where the soft fluffy insulating material 66 is shown placed on the base wall 50. Supporting spacers 68 can be placed within the enclosure to prevent the soft glass fiber material from compressing.

Positioned on top of the insulation there is provided an absorber sheet 70 which is formed into individual strips 72 and is woven in a basket weave fashion about the parallel risers 74. The risers all feed into a common manifold 76 at one end of the collector section and is supplied by means of the inlet 78. Another similar manifold would be provided at the other end with an outlet to extract the fluid from the riser grid system.

The absorber sheet is typically formed of aluminum in order to minimize weight and cost and the riser grid system is typically formed of copper to provide good conduction of the heated fluid therein. The absorber sheet requires no soldering onto the riser grid but depends upon tensile forces to maintain forceful mechanical contact to the riser grid system. The riser grid system itself can be assembled to any length by brazing or standard sweat joining, or other similar means.

The absorber sheets can best be seen in FIG. 7 where they are formed of sections of materials, typically shown as the one foot long by 32 inches wide section of aluminum absorber material 80, which is cut into individual strips 82, typically one inch apart. A border 84 of approximately one inch is left on the sides. The absorber sheet can then be fed onto the risers 86 in basket weave fashion. This facilitates mounting of the absorber sheet, section by section onto the riser grids which may be of any length.

As is shown in FIG. 9, the ends of the absorber sheet can be opened. As is shown, individual strips 88 of the absorber material are individually basket woven onto the riser grids 90. The manifold 92 interconnecting the riser grids is also shown. It should be understood, that the embodiment shown in FIG. 9 could also be formed of a single sheet wherein the ends could be cut after a section of absorber sheet has been placed onto the riser grid. An additional modification is that the strips are made of photo-voltaic cells wired appropriately. Thus the collector can be used for electric power generation as well as heat collection. In fact the power generation is made more efficient by the cooling effect of the water or other fluid collecting the heat.

The riser grid system itself can be either a single grid system, as shown in FIGS. 7 and 9, or it could alternately be a dual riser grid system, as shown in FIG. 8. With the dual riser grid system, a first set of risers 94 are interconnected to a common manifold 96. A second set of risers 98, are interconnected to another common manifold 100. All of the risers are arranged so as to have one set alternating with the other set. The risers themselves lie in a common plane and are then basket woven by the absorber sheet 102. The manifolds 96, 100 are spaced apart both vertically and horizontally so as to occupy minimal space and yet be separated. The manifolds would be formed both at the upper and lower end of the collector sections serving as distribution and collection manifolds.

Typically, when a single riser grid system is utilized, using good fin theory, seven riser tubes would be spaced in a suitable manner to provide the best efficiency using such fin theory. In the case of a dual grid collector, one grid system would have six riser tubes between its manifolds and the other grid system would have five riser tubes between its manifold, spaced to lie between the first riser grid tubes. The manifolds themselves occupy minimal room at the opposing ends of the collector section. It should be understood, however, that the number of riser grid tubes utilized would depend upon the particular size of the collector section.

By increasing the strip wrap of the absorber sheet, transfer efficiency can be improved with larger number of riser tubes. However, again the particular wrapping would depend upon the desired configuration and size.

Figure 6:
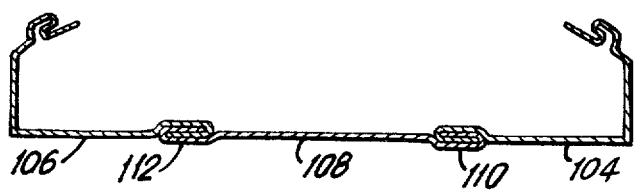
FIG. 6 is a cross sectional view of the enclosure pan in accordance with another embodiment wherein the pan can be formed as two side sections interconnected by a bottom section.

Referring now to FIG. 6, there will be shown an alternate embodiment of the enclosure pan. Rather than utilizing a single sheet of material which is bent into the entire U-shaped enclosure pan, separate sections can be utilized. Specifically, the side sections 104, 106 can be shaped as previously indicated including the side walls and the upper arms having the "Pittsburgh" bends. However, the bottom wall would be formed by portions of the side sections 104, 106 interconnected by a middle section 108 which is joined to the side sections by means of a "acme" bend 110, 112, at each side thereof. Utilizing the embodiment shown in FIG. 6, it is easier to form the enclosure pan directly in situ.

Referring now to FIG. 3, the solar plate collector includes glazing material at its upper surface. The glazing is shown as including an upper layer 114 which is maintained between the "Pittsburgh" bends 60, 62 and a lower layer 116 which is maintained beneath the arms 56, 58. The glazing should be thin, inexpensive glass made strong and rigid by forming it into a curve that will fit the glazing into the Pittsburghs. The other layer would be curved so as to fit under the arms, as described.

The glazing could be of production length or smaller sections could be used which will join to abutting lengths and be sealed using standard stain glass technology or other simple "H" section joiners. The second lower glazing is mounted just below the outer glazing so as to yield a dual glazed solar collector. It should be appreciated, that the radius of curvature of the upper and lower glazing material differ because of the locations in which they are placed.

Another glazing that can be used is fiberglass reinforced acrylic modified polyester. Such material is presently available under the name "Sun-lite" by Kal Wall Solar Components Division, Manchester, New Hamspshire. It is preferred that this product be formed with a curve that will enable the glazing to mount from Pittsburgh to Pittsburgh almost unstressed. It is also desirable to glaze this collector with an inner cover of glass and an outer cover of one piece fiberglass reinforced acrylic modified polyester. By curving the glazing, minimum thickness of expensive, heavy, sun light obstructing materials will be required.

Referring now to FIG. 14, it is noted that the glazing 118 can be reinforced by forming it with indents 120 transversely positioned across the curvature of the glazing material and longitudinally spaced along the length of the glazing. These indents rigidize the curve length for additional strength. The material can be made in standard lengths and includes a lip at one end and a shelf at the other end which will mate with corresponding shelves and lips of adjacent glazing sections in order to form a composite length.

It should be appreciated that with the particular solar collector section described, the length can be made as needed and can therefore be formed so as to accommodate entire roof sections. In order to cover a complete width of a roof section, adjacent elongated collector sections can be joined together. Referring now to FIG. 10, there is shown two adjacent solar collector sections 122, 124, of the type previously described. These two sections are interconnected by means of a snap cap 126 having a curved upper surface 128 with inwardly depending arms 130, 132. The arms snap into the adjacent Pittsburghs to form a tight fitting, interconnecting connector therebetween. It is understood, that the snap caps 126 are elongated so as to extend the length of the solar collector sections.

Beneath the adjacently connected collector sections, there can also be provided a drain strip 134 which can catch any water which may tend to seep between adjacent collectors. The drain strips can feed into the normal house drainage system. In this manner, the solar collectors can be formed of any desired length and adjacent sections can be interconnected into a desired width so as to form a complete waterproof solar collector which can be placed upon a roof and can be utilized in place of existing roofing.

Referring now to FIG. 11, it will be noted that the ends of the section of the solar collector 136 is fitted with an end cap 138 which is formed of metal material having an arcuate upper end 140 with an inwardly directed lip 142 and a substantially flat bottom edge 144 having an inwardly turned lip 146. The bottom lip 146 can fit between the insulating layer 148 and the bottom of the enclosure pan 150. The upper lip 142 is held in place on the upper glazing material 152 by means of pop rivets inserted between the apertures 154 formed in the glazing material and apertures 156 formed in the lip 142. In this way, the end cap suitably closes the end of the solar collector section.

Openings 158, 160 are suitably provided in the wall 162 of the end cap to accommodate passage of the tubes 164, 166 connected to the manifold of the riser grid systems. As shown in FIG. 11, a dual riser grid system is utilized. If a single riser grid system would be utilized, only one of the apertures 158 or 160 would be utilized.

In order to provide ventilation within the collector section and avoid overheating, a suitable bent hole is provided in the end cap. Specifically, there are provided two D-shaped openings 168, 170 which are abutting each other and are spaced by means of the interpositioned material 172. A hole 174 is provided in the material 172.

A snap disk ventilator cover 176 is provided which is formed of a bi-metallic dish shaped disk. The disk is held in place and positioned over the two D-shaped openings by means of a wing nut 178 which is held in place by means of a screw 180 fitting through the apertures 17. A spring 180 is wound on the shaft of the wing nut 178.

Referring now to FIGS. 12 and 13, it is noted that under normal situations, the bi-metallic dish shaped disk 176 is concavely shaped with respect to the end cap 138 so that it covers the D-shaped vent openings 168, 170. If overheating occurs, as during stagnation, the bi-metallic disk snaps open, as shown in FIG. 13, so as to form a convex shape with respect to the end cap 138. This opens the vent openings 168, 170 and by means of a "chimney effect" cold air is drawn in at the bottom of the solar collector section to replace hot air leaving at the top. When the solar collector has sufficiently cooled, the bit-metallic disk will return to its normally concave shaped position to again close the vents.

The bi-metallic material can be set at a specific temperature, and suitable adjustment can be achieved by means of the spring by properly tightening the wing nut to a desired pressurized amount.

Typically, the end cap shown in FIG. 11 will be provided both at the bottom and top end of the solar collector section. Additionally, the bi-metallic dish shaped disk covering the vent openings would also be provided at the upper and lower ends. However, because of the tight construction of the solar collector section, in many cases, the lower end would not need any disk but the vent openings could remain open. The only time cool air would be drawn in at the lower end is when the overheating causes the disk at the upper end to uncover the vent openings at the upper ends. The resulting losses would be negligible. However, even such losses could be even further reduced by installing a short stub like cylinder inwardly directed from the open vent holes at the bottom of the solar collector system.

The particular solar collector can be formed of absorber sheets formed of any material and woven in the basket weave fashion previously described. Similarly, the riser grid system can also be formed of any suitable material useful for such purpose. However, the particular materials heretofore described are of special usefulness in order to make the construction lightweight, low cost, and suitable for manufacture in sections which can be made of any desired length and joined together to fit a desired width.

As heretofore explained, the particular solar collector sections are interconnected by external headers providing manifolding of the distribution and collection of the fluid to the various sections. These external headers should normally be insulated in order to avoid heat loss. While such insulation can be provided prior to placement of the headers and other manifolding pipes, insulation can be provided in situ in accordance with the present invention.

Specifically, referring now to FIG. 23, there is shown a pipe 184 which is typical of any of the pipes positioned outside of the solar collector. The pipe can be installed in place and subsequent to the installation a bag 186 is placed around the pipe. For example, such bag could be a polyethylene sleeve which is held in place by means of suitable ties 188, 190 or other constrictions holding the sleeve to the pipe. Additionally, a zip type bag or sleeve could be utilized. An opening 182 formed in the sleeve is available for connection to a pipe 194 connected to a typical foam pack 196. Such foam packs are generally utilized for example, in providing sealing insulation in situ.

By frothing the foam into the sleeve, the sleeve will be filled with foam insulation which hardens very readily to form the insulated pipe in situ after it is installed and connected to the solar collector.

As explained in FIG. 1, once the fluid medium has been heated in the solar collector, the heat must be extracted from the fluid medium and transferred to other fluids for use in subsequent heating. For example, the fluid medium from the solar collector is typically sent through the heat exchanger where the heat is transferred to hot water from a hot water system, as well as to an area heating system, or other such heating as is needed. Also, extra heat is transferred to a fluid medium which is sent to a storage device to store the extra fluid.

Referring now to FIG. 15, a new heat exchanger is described which improves the performance over typical types of hot water tank storage systems and other heat exchange devices. The heat exchange unit includes an outer tank 200 having a closed bottom and an open top, which top is sealed by means of a round cover 202. A circulating loop 204 is provided which has its inlet at the bottom of the tank 200 at 206 and is pumped upwardly through a pump 208 so as to return through the return tube 210 through the top cover 202 and back into the container tank 200. This is referred to as the "optimizer loop".

The coil containing the fluid medium from the solar collector is placed within the tank 20 as are also placed coils containing fluid mediums from the various other heating systems which are to be heated. These coils are connected inside the tank 200. By use of the optimizer loop, storage water is sent downward into the tank 200 which washes over the input coil containing the heated fluid and transfers the heat to the other coils. This water is then collected at the bottom and again pumped upwardly through the optimizer loop.

Further improvement is achieved by causing forced flow of this circulating fluid to take place within the tank. This forced flow is achieved by placing an inverted drum 212 inside the tank 200. The various coils are wound around the inverted drum in any order. For example, one of the coils 214 is shown having an inlet 216 which passes through an opening 218 provided in the cover 202. This coil could be utilized for the heated fluid medium from the solar collector. After passing around the drum 212, this fluid can be extracted through the outlet, 220 which likewise passes through an opening 222 in the cover 202.

The various coils wrapped around the drum make a loose fit around the drum and serve to retain the drum held within the tank. However, for further stability additional legs 224 can be placed in the tank to hold up the drum.

The inverted drum has a number of small perforations 226 placed in the top of the drum to bleed any embolism that may collect within the drum and in this way reduce the storage volume. It is understood that the bottom of the drum would be opened.

When the optimizer loop sends the fluid downward into the tank, it is forced by means of the drum to flow over all of the coils and thereby transfer the heat from the heated coil to the other coils. This forced flow concentrates the transfer of heat and improves the efficiency. The fluid is then returned to the optimizer loop to be repumped through the tank.

Referring now to FIG. 16, a schematic version of the various coils are provided. Typically, the heated fluid from the fluid collector would be sent in through the pipe 228, wrapped around the drum 230 by means of the coil 232, and removed by means of the tube 234. An additional pipe inlet 236 brings in hot water from a hot water system and passes through the coils 238 wound around the drum 230. The hot water then leaves through the outlet 239. Fluid from an area heating system can be sent in through the inlet 240 and wound around by means of the coil 242 which is wrapped about the drum 230 and is then sent out through the outlet 242.

In this manner, as is the liquid from the optimizer loop passes over the coils, it takes the heat from the coil having the fluid medium from the solar collector and transfers the heat to the other coils.

Referring now to FIG. 17, use of the storage tank will be described wherein the fluid is heated by means of the solar collector 246 and sent down through the fill tube 248. A necessary control 250 is provided to control the amount of fluid flowing into the system. The fluid then flows out and passes through an expansion tank 252 back to the collector. Suitable pressure relief valves 254 and air bleed valves 256 are provided in the system.

A source of water sends the water through the coil 258 into the tank 260 where it is heated by means of the fluid medium from the collector. The heated water then passes out along the pipe 261. The optimizer circuit 262 provides the continuous flow of fluid through the heat exchanger tank 260. The control system 264 is provided to send the proper amount of liquid back through the optimizer circuit.

The necessary controls 250, 264 include logic circuits which sense load demand and also sense available heat supply. Such circuits are well known. With these two conditions existing, the necessary amount of liquid will be sent through the optimizer circuit to maintain the amount of heat needed for the load demand. When the demand and available storage conditions exist for flow through the optimizer loop, all of the flow will take place over and along the various coils in the heat exchange unit. No useless flow can take place through the center of the heat exchange unit. The air bleed perforations are negligible to the fluid flow.

Using the heat exchange device described, there has been found a five fold increase in the transfer fluid velocity across the exchange coils. Efficiency and thermal transfer are directly proportional to this transfer fluid velocity and accordingly higher efficiencies are achieved.

The outer tank 220 as well as the inner drum, can be designed so that they are shipped in the flat and easily assembled by the user. This further maintains the low cost benefit of the present solar collector system.

As heretofore explained, in addition to the coils heretofore described which are wound around the drum in the thermal exchange column, an additional coil can be sent to a storage device, as shown by the outlet 266 in FIG. 17. Extra heat provided by the heat in the solar collector can be stored for those times in which there is no sunlight, such as nighttime or darkened periods through the day. In such cases, the heat will be sent back from the storage unit 265 and through the thermal exchange column to be transferred back to the hot water system or area heating systems to maintain such heat even during darkened periods. Also, as heretofore explained, by sending the heat back from the storage unit through the thermal exchange column, the fluid medium in the solar riser grid system will also be heated. When utilizing a dual riser grid system, the heated fluid will be transferred in the solar collector to the second fluid medium in the other riser grid system for use in an air conditioning system as will hereinafter be explained.

In utilizing the solar energy for driving an air conditioning system, a regenerator device is provided, as is shown in FIG. 18. Specifically, the regenerator, shown generally at 270 includes two substantially parallel cylindrical chambers 272, 274 each having an elongated slit opening 276, 278 which are interconnected by arcuately curved parallel walls 280, 282 defining a ductway 284 therebetween. The cylindrical chamber 272 is larger than the cylindrical chamber 274 and is positioned in a plane above cylindrical chamber 274. The upper, larger chamber 272 is heated, as for example, by providing the insulation 286 surrounding that chamber. On the other hand, the lower smaller chamber 274 is cooled, as for example, by providing the fins 288 for liquid or air convection cooling. The fins are shown to extend also along the arcuate wall 284 so as to provide cooling along that ductway as well. It should be appreciated, that the fins also serve for providing structural strength to the device.

An inlet 290 is provided which includes a float valve 292 or other shut off type of valve. The fluid entering is heated from the solar collector and typically includes a mixture of the flow medium with additional liquid. The mixture is maintained at the heated temperature within the chamber 272 until the volatile fraction of this solar heated mixture evaporates. The vapor will pass along the ductway 284 and will be cooled as it passes therealong until it finally condenses and collects in the chamber 274. The condensed volatile fraction can then be extracted through the outlet 296. The input mixture, which is now diluted by removal of the volatile fraction, can also be extracted from the heated evaporation chamber 272 by means of the outlet 294.

By placing the regenerator of FIG. 18 adjacent to the solar collector, the combination effectively forms a distillation device of a type which can be utilized within absorption cycle air conditioning systems.

As is shown in FIG. 19, the solar collection 300 receives the energy from the sun 302 to heat the mixture passing through the riser grid system 304. The heated fluid mixture is then sent into the linear regenerator accumulator 306 of the type heretofore described in connection with FIG. 18. The refrigerant material is then collected in the condenser chamber 308 and passes through the valves 310 to the air conditioning heat exchange unit 312, of the type well known in the art. There, the refrigerant is utilized to provide the necessary cooling through the air conditioning duct 314.

The refrigerant will then pass through the normal receiver, expansion valve, and evaporator, as is known in the art. Finally, the refrigerant will pass into the absorber 316. The diluted mixture extracted from the evaporation chamber 318 of the regenerator 306 passes through the tube 320 to an accumulator 322 where under proper control of a control circuit 324 of a type well known in the art, the valve 326 opens to send the fluid into the absorber to once again be mixed with the refrigerant. The thermostat control 328 controls the pump 330 to properly pump the mixture back to be reheated.

Depending upon the type of fluid utilized, will depend upon whether the refrigerant is extracted from the condensing chamber, or, alternately, the refrigerant could be extracted from the evaporation chamber as the water is taken from the condensation chamber. For example, various absorbant, refrigerant mixtures which are used in such absorption cycle air conditioning systems, can include amonia/water or lithium bromide/water. The pump rate will be automated to optimize mixture heating temperature at the collector exit. The heated mixture then enters the regenerator where evaporative separation is accomplished along with condensation.

During the hot sunlit day, the solar input itself will run the air conditioning unit and surplus thermal energy will be stored. At night, the air conditioning thermal demands will be met by running the stored heat back through the collector where the heat will be coupled from the hot water riser grid to the air conditioning riser grid and regeneration can still take place.

It should be appreciated that the regenerator device heretofore described essentially described a distillation device which can be utilized as a solar driven still. It is basically designed to separate two mixed liquids having different boiling points. This would include even alcohol and water, as well as other similar applications. In each case, there is provided appropriate solute/soluble separation. As the mixture of the solution is heated from the solar collector, and enters into the linear evaporator/condenser, the larger surface is presented for the hot fluid to release the more volatile faction. This diffuses into the cooler area to condense. Accordingly, alcohol could be separated from other material in a similar type of arrangement.

It should be appreciated, that for the absorption cycle air conditioning, the necessary pressure levels would have to be maintained by means of suitable pressure control. However, this is well known in the art and can easily be applied by using standard techniques.

As explained in connection with FIG. 1, in order to maximize the output of the heat generating equipment, it is necessary to provide for the storage of at least a portion of the heat accumulated during the day time for the subsequent utilization either at night or during the sunless day. The conventional manner of storing heat is in mass temperature rise. A better method utilized the heat-of-fusion that accompanies the change of state from a solid to a liquid in appropriate chamical compounds which are known to possess a high degree of eutaxia. One such compound which is well known in the field of solar energy is Glauber salt ($Na_2SO_4.10H_2O$). When the heat stored in the Glauber salt is desired to be extracted, the liquid phase, by lowering of the temperature, is again returned to its solid state and the heat thus extracted and utilized.

Heretofore, Glauber salt was utilized as a mass from which the water of crystallization was continuously anternately separated from the sodium sulfate (thus absorbing heat) and subsequently recrystallized and recombined with the sulfate radical (giving up the heat previously stored). During this continuous alternating chemical process, however, not only was there experienced a considerable loss in the amount of Glauber salt available for storage, but the molecules of water of crystallization, after a rather limited number of chemical changes, would become more and more depleted so as to lower the efficacy of the salt itself.

It has now been discovered that the useful property of Glauber salt may be retained and the maximum number of molecules of water of crystallization ($10H_2O$) in the salt may be preserved throughout a very high number of chemical reversals in the heat-storing and the heat relinquishing steps, by enabling the Brownian molecular motion in the salt to prevent the physical separation of the water of crystallization molecules from the salt molecular structure. The principle of the Brownian motion in colloid particles has been found to be suitable for application in the field of solar energy, in that it produces diffusion in the same manner that diffusion in gases and liquids is produced by molecular motion.

The life of Glauber salt is extended indefinitely because it is believed that the diffusion of the salt into its water-of-crystallization can be maintained within a narrow radius.

It has therefore been discovered that by micro-encapsulating the molecules of Glauber salt in a suitable matrix, the Brownian motion principle could be arrived on a practical basis. A suitable matrix was found to be one consisting of a polyester normally used by the molded furniture industry by extending it with water for economy reasons. The method for microencapsulating the Glauber salt, briefly stated, consists of preparing an emulsion of Glauber salt in the liquid polyester, followed by the solidification, by means of suitable accelerators, of the polyester material, resulting in the microencapsulation of the salt in a matrix. Another manner of encapsulating Glauber salt consists of providing a porous solid matrix consisting of any material which is chemically inert to sodium sulfate, even cement, and immersing the matrix into a bath of molten Glauber salt, thus causing the salt to enter the pores of the matric by liquid diffusion. Still another method of preparing Glauber salt for use in storing solar heat energy consists of pelletizing Glauber salt and coating it with a polyester, epoxy or equivalent material, thus forming a microencapsulation. The concept behind all these variants is always the same, namely the utilization of Brownian motion in the individual molecules of Glauber salt to prevent separation of the salt from its water-of-crystallization.

Turning now to FIG. 20, a typical practical utilization of Glauber salt is illustrated in which large amounts of heat can be stored, avoiding the disadvantage of salt separation which heretofore used to take place when the water of crystallization was allowed to separate freely from the sulfate component of the molecule. FIG. 20 represents a plurality of blocks 332 composed of a solidified polyester with microencapsulated therein a maximum amount of Glauber salt molecules. The blocks are stacked together to form a storage unit within an enclosure 334. Pipes 336 connected to the heat exchanger are fixedly embedded in each block and are manifolded together to provide a single input and output. The fluid employed in the thermal process is caused to pass through the pipes, thus transferring heat to the block of polyester and re-extracting it therefrom when required. The heat is retained by the small globular encapsulation of Glauber salt, without separation of the water of crystallization, and then released when the heat-transfer process is reversed. Other heat retention units may consist of combinations of diatomaceous earth with Glauber salt or epoxy resins with crystalline Glauber salt, the salt always being either microencapsulated or macroencapsulated in the matrix or carrier substance; nucleating agents and/or accelerators and/or binders are utilized generally when needed, in order to obtain the desired micro/macro-encapsulation and solidification characteristic.

As an alternate to utilizing a liquid flow medium in the solar collector, there can also be provided an air heating flat plate solar collector system, as is shown in FIGS. 21 and 22. A long trapezoidal blackened absorber sheet, typically of aluminum, is shown at 338. The perforations 340 are suitably placed all along the sheet. When the trapezoidal sheet 330 is curved so that the elongated sites 342, 344 are placed parallel, the end corresponding to the wider part of the trapezoidal shape will be pushed upwardly a greater extent than the opposing end. This is shown as a side view where the edge 346 extends upwardly to a greater height than the end 348.

By placing the absorber sheet shown in FIG. 21 in an enclosure of the type heretofore described, the air heating solar collector in FIG. 22 can be obtained. Specifically, there is provided the substantially U-shaped pan enclosure 350 having a glazing medium 352 supported on the upper surface with the end caps 354 at each end of the elongated solar collector section. Internally of the enclosure there are placed a plurality of the trapezoidal sheets in longitudinally spaced apart, but overlapping relationship. Each of the sheets will have its side edges parallel and abutting the side walls of the elongated pan enclosure. As a result, since they are initially formed from trapezoidal sheets, the upper edge 338 of each sheet will abut the glazing material while the lower edge will essentially be adjacent to the bottom of the enclosure pan.

Air enters at the bottom of the collector over the perforated absorber sheets and passes through the perforations heating in the process. By design, the air can pass through a number of perforated absorber sheets before leaving the collector at the opposing end. The heated air can then be ducted to storage, space heat, or domestic hot water heat exchangers.

It should be appreciated, that various parts of the solar collector would be blackened, as for example the absorber sheets, and the grid systems, in order to provide greater heat absorption. Furthermore, various materials can be utilized as are well known in the art.

There has been disclosed heretofore the best embodiments of the invention presently contemplated. However, it is to be understood that various changes and modifications may be made thereto without departing from the spirit of the invention.

What is claimed is:

1. A solar heating system, comprising:
   solar collector means comprising heat absorber means for absorption of solar radiation and two separate riser grid systems containing respective flow mediums therein, for being heated by the solar radiation absorbed;
   heat exchange means coupled to a first of said riser grid systems for extracting the heat from the flow medium therein to provide a heating fluid;
   regeneration means coupled to the first of said riser grid systems for distillation of the flow medium therein to extract a component therefrom for further utilization; and
   at least one of said two separate riser grid systems comprising a plurality of parallel tubes interconnected at their respective lower and upper ends by respective manifolds, said solar collector means including a heat absorber comprising a sheet of heat-absorption material formed into strips and woven, basket-fashion across the tubes of said at least one riser grid system.

2. A solar heating system as in claim 1, wherein said solar collector means comprises an enclosure, and both said riser grid systems are contained within said enclosure.

3. A solar heating system as in claim 2, wherein said solar collector means comprises a plurality of elongated flat plate solar collector sections longitudinally abutting each other to define a composite roof collector, each section having said two separate riser grid systems, and further comprising a header respectively below and above said composite collector for respectively feeding and collecting all of said first riser grid systems with its flow medium and all of said second riser grid systems with its flow medium.

4. A solar heating system as in claim 3, wherein said composite roof collector extends from the ridge to the eave of the roof and replaces conventional roofing.

5. A solar heating system as in claim 1, wherein each riser grid system comprises a plurality of parallel tubes interconnected at their respective lower and upper ends by a respective manifold, said first and second riser grid systems arranged with respect to each other so that the tubes of each system are coplanar and alternate with the tubes of the other system, and the manifolds at each end are spaced from each other.

6. A solar heating system as in claim 5, wherein said heat absorber comprising said sheet of heat absorption material formed into strips is woven, basket-fashion across the tubes of said first and second riser grid systems.

7. A solar heating system as in claim 6, wherein said sheet of heat absorption material is retained in place by means of the tensile force between the sheet and the tubes.

8. A solar heating system as in claim 6, wherein said solar collector means further comprises an elongated enclosure pan, insulation material formed in the bottom of the pan, said insulation material supporting said interwoven absorber sheet and riser grid systems, and a glazing means covering the top of the enclosure pan.

9. A solar heating system as in claim 8, and further comprising end closure members for closing the upper and lower ends of the pan, openings formed in said closure members for entry and exit of tubes connected to the manifolds, and vents formed in said closure members for automatic relief of overheating within the enclosure.

10. A solar heating system as in claim 9, and further comprising a bimetallic snap-disc ventilator cover for covering at least one of said vents.

11. A solar heating system as in claim 1, wherein said heat exchange means comprises a container, a first continuous coil in said container coupled to said first riser grid system for providing heat to the heat exchange means, a plurality of additional continuous coils in said container each coupled to a respective utilization means including a heating system, a hot water system, and the like, a circulating loop means external of the container for collecting liquid from the bottom of the container and pumping it to the top of the container, whereby the liquid will flow onto all of said continuous coils in the container transferring heat from said first coil to said additional coils, and control means responsive to the load demand of the utilization means and to the available supply of heat for controlling said circulating loop means.

12. A solar heating system as in claim 11, and further comprising a drum means positioned within said container and having a closed top and open bottom, all of said coils being wrapped around said drum means, whereby said drum means concentrates the flow of the liquid from said circulating loop means around said coils.

13. A solar heating system as in claim 2, and further comprising bleed holes formed in said closed top.

14. A solar heating system as in claim 11, and further comprising a storage medium means coupled to one of said additional coils for storing excess heat developed during the sunlight periods and during the darkened periods transferring back the stored heat to said first coil and to the other of said additional coils.

15. A solar heating system, comprising:
- solar collector means comprising heat absorber means for absorption of solar radiation and two separate riser grid systems containing respective flow mediums therein, for being heated by the solar radiation absorbed;
- heat exchange means coupled to a first of said riser grid systems for extracting the heat from the flow medium therein to provide a heating fluid;
- regeneration means coupled to the second of said riser grid systems for distillation of the flow medium therein to extract a component therefrom for further utilization; and
- said regeneration means comprising an evaporation chamber and a condensing chamber, means associated with said evaporation chamber for maintaining it in a heated condition, means associated with said condensing chamber for maintaining it in a cooled condition, connection means interconnecting said two chambers, and input means for providing the heated flow medium from said second riser grid system to said evaporation chamber, first output means coupled to said condensing chamber for extracting the distillate component, and second output means coupled to said evaporation chamber for extracting the distilled medium.

16. A solar heating system as in claim 15, wherein said regeneration means is located adjacent said collector to avoid heat loss in the flow medium in said second riser grid system.

17. A solar heating system as in claim 15, wherein said respective riser grid systems are part of a corresponding first and second closed flow system, and wherein said regeneration means is part of an absorption cycle air conditioning system, whereby the extracted component is the refrigerant, and further comprising an absorber means coupled in said second flow system for recombining the refrigerant into the flow medium of that system.

18. A solar heating system as in claim 17, wherein said two riser grid systems are in heat exchange relationship through said heat absorber, and further comprising a storage medium means coupled to said first flow system for storing excess heat developed during the sunlight periods, and sending the stored heat back through said first flow system during the darkened periods, whereby the air conditioning demand will be met by direct sunlight heating of said second riser grid system during the sunlit periods and by coupling heat from said first riser grid system during the darkened periods.

19. A solar heating system as in claim 18, wherein said storage medium means is coupled through said heat exchange means, whereby during sunlit periods it stores excess heat through heat exchange relationship with said first flow system in said heat exchange means, and during darkened periods it returns heat to said first flow system and to said heating, hot water, and the like, through said heat exchange means.

20. A solar heating system as in claim 15, wherein said evaporation chamber is larger than said condensing chamber.

21. A solar heating system as in claim 15, wherein said evaporation chamber is at a lower planar level than said evaporation chamber.

22. A solar heating system as in claim 21, wherein each chamber comprises elongated cylindrical tanks, said tanks being parallel to each other, each tank having an open longitudinal slit at its upper end, and a ductway interconnecting the open slits of said two tanks.

23. A solar heating system as in claim 22, wherein said means for heating comprises insulation means surrounding said evaporation tank, and said cooling means comprises cooling fins formed on said condensing tank.

24. A solar heating system as in claim 23, wherein said cooling fins are also formed on the exterior side of said ductway.

25. A solar heating system as in claim 22, wherein said ductway comprises a pair of parallel curved walls so as to direct the distilate into said condensing member.

26. A solar heating system, comprising:
- a solar collector means comprising heat absorber means for absorption of solar radiation and two separate riser grid systems containing respective flow mediums therein, for being heated by the solar radiation absorbed;
- heat exchange means coupled to a first of said riser grid systems for extracting the heat from the flow medium therein to provide a heating fluid;
- regeneration means coupled to the second of said riser grid systems for distillation of the flow medium therein to extract a component therefrom for further utilization; and
- a heat storage system coupled to said heat exchange means, and comprising a plurality of blocks of Glauber salt-containing matrix material, said blocks having embedded therein and passing therethrough at least one liquid-transfer means.

27. A solar heating system according to claim 26, wherein said Glauber salt is micro-encapsulated within the said matrix material.

28. A solar heating system according to claim 26, wherein said Glauber-salt is macro-encapsulated within said matric material.

29. A solar heating system according to claim 26, wherein said Glauber salt comprises coated pellets of Glauber salt.

30. A regeneration apparatus, comprising:
- solar heating means for heating a flow medium;
- a single regenerator unit comprising an evaporation chamber and a condensing chamber, means associated with said evaporation chamber for maintaining it in a heated condition, means associated with said condensing chamber for maintaining it in a cooled condition, connection means for interconnecting said two chambers, input means for providing the heated flow medium from said solar heating means to said evaporation chamber, first input means coupled to said condensing chamber for extracting the distilate component, and second output means coupled to said evaporation chamber for extracting the distilled flow medium.

31. A regeneration apparatus as in claim 30, wherein each of said chambers comprise an elongated tank, said tanks being in parallel, and each tank having a longitudinal opening at its respective upper end, and a ductway interconnecting said opening.

32. A regeneration apparatus as in claim 31, wherein said evaporation tank is at a higher planar level than said condensing tank.

33. A regeneration apparatus as in claim 32, wherein said evaporation tank is larger than said condensing tank.

34. A regeneration apparatus as in claim 30, wherein said solar heating system comprises a solar collector and wherein said regenerator unit is located directly adjacent said solar collector.

35. A regeneration apparatus as in claim 31, wherein said connection means comprises a ductway having a pair of parallel spaced apart curved walls.

36. A regeneration apparatus as in claim 31, wherein said means for heating comprises insulation means surrounding said evaporation tank, and said cooling means comprising cooling fins formed on said condensing tank.

37. A regeneration apparatus as in claim 35, and further comprising cooling fins on an exterior side of said ductway.

38. A regeneration apparatus as in claim 31, wherein said regeneration means is part of an absorption cycle air conditioner system, whereby the extracted component is a refrigerant and further comprising an absorber means coupled to said second output means for recombining the refrigerant into the flow medium.

39. A regeneration apparatus as in claim 38, and further comprising control means in said input means for controlling the rate of flow of said flow medium into said regenerator unit for suitable refrigerant extraction.

40. A regeneration apparatus as in claim 38, and further comprising accumulator means interconnected between said second output means and said absorber means.

* * * * *